Patented June 10, 1930

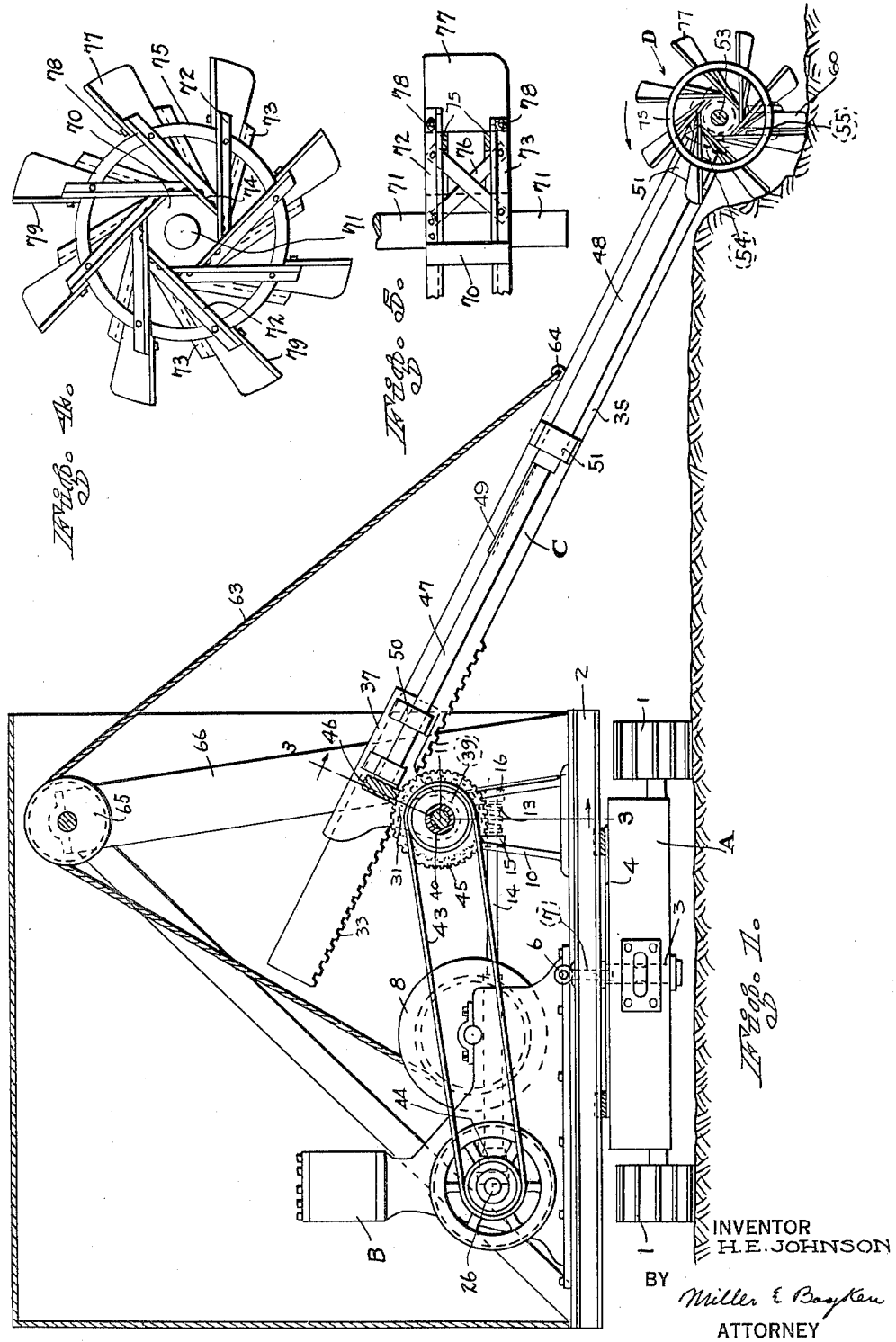

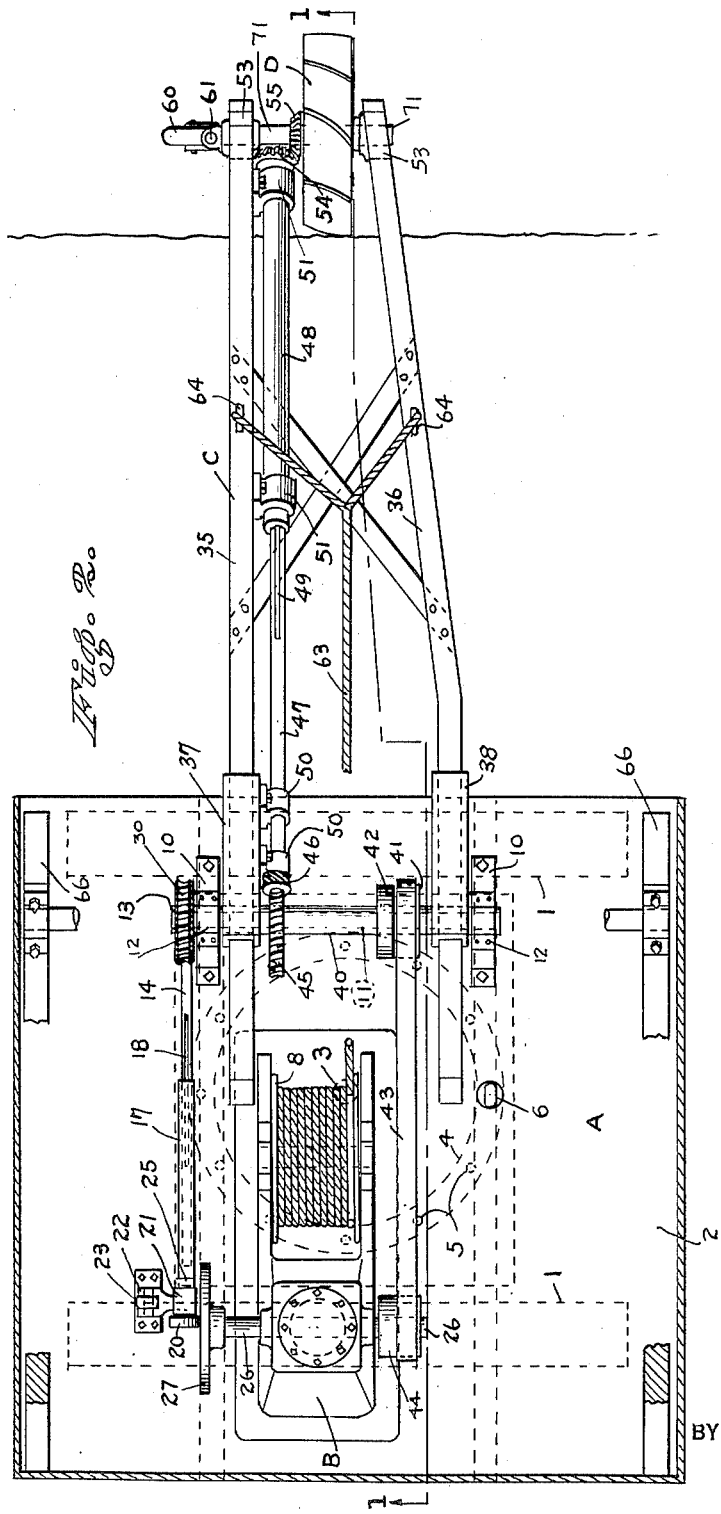

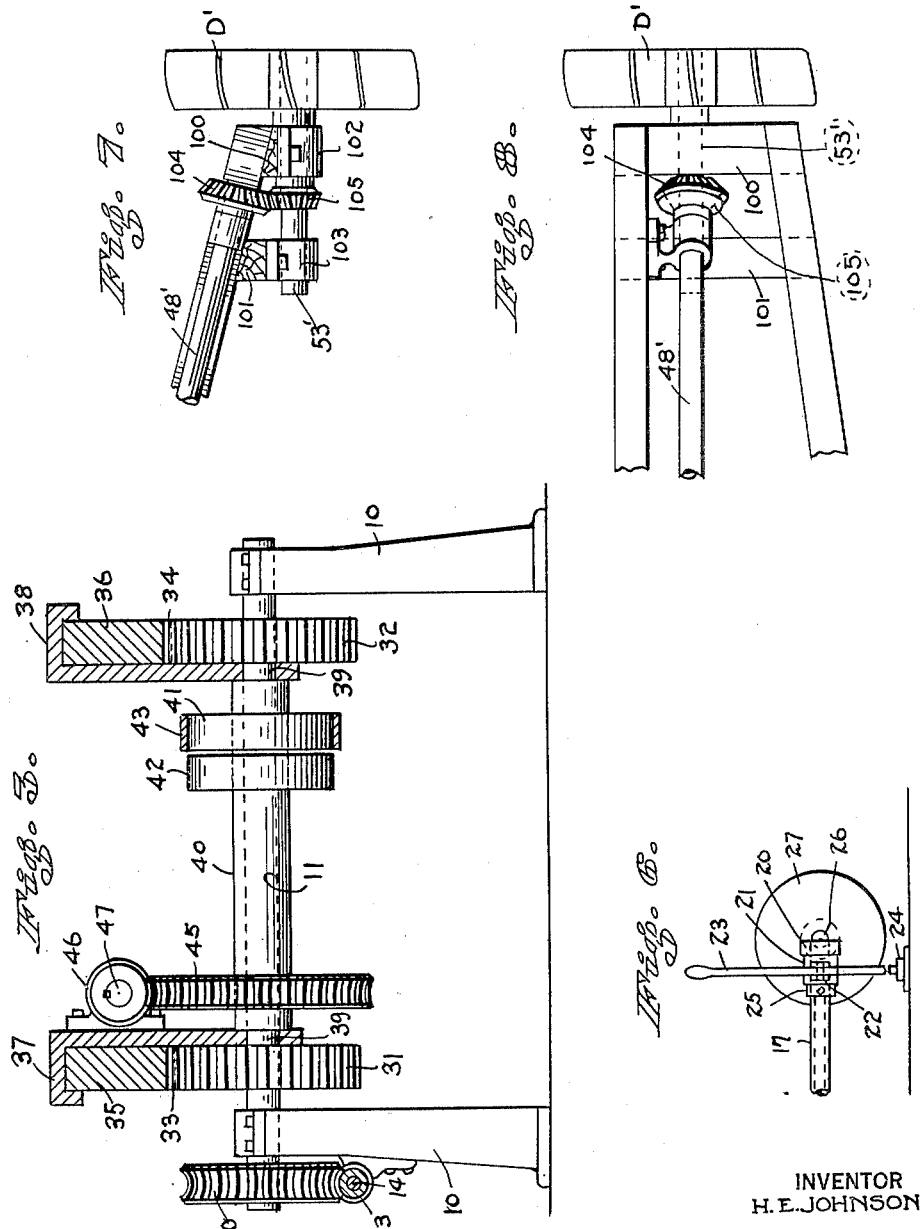

1,762,441

UNITED STATES PATENT OFFICE

HJALMAR EMANUEL JOHNSON, OF SAN FRANCISCO, CALIFORNIA

MACHINE FOR CLEANING AND DIGGING DITCHES

Application filed October 14, 1927. Serial No. 226,097.

This invention relates to machines of the boom type that are used for ditching purposes.

One object is to produce a machine that will clean ditches of growth such as grass, sediment and the usual plant life that grows in irrigating ditches and canals.

Another object is to provide a machine so constructed that it may be used to dig ditches as well as clean them.

Briefly described my invention resides in the combination of a boom mounted on a movable carriage—a rotating cutting wheel mounted on the end of the boom with means for extending and swinging said boom together with means for rotating the cutter wheel as well as means for supporting the cutter wheel in doing some kinds of work.

One advantage of thus mounting a rotating cutting wheel at the end of a boom occurs in the case of a broad ditch. By using my machine, the carriage may be pulled or, self propelled, along the side of the ditch and both sides cleaned at one setting or a new ditch may be cut either with the machine straddling the ditch or running alongside, and all excavated dirt thrown on top at one side of the bank.

Another advantage happens in the case of a crooked ditch or one where the banks are broken and filled with swamp growth. The use of the extensible boom in this case makes it possible to move the cutting wheel in or out of any pocket like indentures in the banks and thus cut away the debris.

A further advantage resides in the provision of means for raising and lowering the boom. This is particularly advantageous for use in ditches with gates or control dams that must be jumped in cleaning.

A still further advantage is the combination of a ditch digging with a ditch cleaning machine. This is usually accomplished by rotating the boom until it follows the carriage instead of extending at a right angle to the line of travel as it does when used as a ditch cleaner. In hard ground a different cutting wheel could be used, but in soft ground the same wheel used to cut débris would serve to cut the ground.

The foregoing recital constitutes some of the objects and advantages of my invention which is hereinafter more fully described and further shown in the accompanying drawings in which—

Fig. 1 is a side elevation partly in section.

Fig. 2 is a top plan view with the cab cut away.

Fig. 3 is a section on line 3—3 of Fig. 1.

Fig. 4 is an enlarged side view of the cutter wheel construction.

Fig. 5 is an enlarged fragmentary plan view of the cutter wheel.

Fig. 6 is a fragmentary view showing the control mechanism for extending and withdrawing the boom.

Fig. 7 is a side view of a modified form with the cutting wheel set in a vertical plane substantially parallel to the line of travel for ditch digging.

Fig. 8 is a top plan view of the same.

In Fig. 1 the machine is seen to consist of a carriage A, a power plant B, a rotatable and extensible boom C mounted on the carriage A, and a rotating cutter wheel D mounted on the end of the boom C.

These are the major parts and are brought into a working combination by the smaller operating parts which will now be taken up and fully described.

The carriage may be self propelled (which is not shown since no invention resides in such) or it may be pulled by some outside power such as a tractor. The wheels 1 may be broad tread steel wheels or Caterpillar tread whichever is most suitable to the type of country over which the machine is to be used.

As shown in Figs. 1 and 2 the platform 2 is rotatably mounted on the carriage frame by means of a pivotal pin 3 and a circular track 4. To lock the platform and hold it in a fixed position, holes 5 are provided in the circular ring or track and a pin 6 is let through a hole 7 in the platform floor into the holes 5 in the circular ring.

This arrangement holds the boom in a fixed position but it is to be understood I do not wish to restrict myself to such a construction since any suitable means for holding and locking the boom in conjunction with power means for rotating the boom will serve the same purpose.

The power plant B is equipped with a hoist drum 8 which is suitably connected thereto, which connection is not shown since any type of a standard hoist will serve.

The mounting for the boom is placed on the forward end of the platform and consists of supports 10 mounted on the platform, which supports carry a shaft 11 suitably journaled thereon as at 12. On one of the supports 10 is mounted a worm 13 keyed to shaft 14 which shaft is carried in the bearings 15 and 16. The shaft 14 telescopes into another shaft 17 and is connected thereto by a spline 18. On the end of shaft 17 a fibre friction wheel 20 is fixedly mounted. Immediately behind and bearing against the wheel 20 is a block 21 rotatably mounted on the shaft 17. The block 21 is provided with a clevis 22 which is screwed into the block but not tightly. Enough threads are left to permit the clevis to turn slightly as the wheel 20 is advanced or retreated by means of the lever 23 which is rigidly mounted on the platform as shown at 24. A small collar 25 is fixedly attached to the shaft 17 and serves as a stop to hold the block 21 against the wheel 20. Fixedly mounted on the shaft 26 of the engine B is a disk 27.

This construction provides means for rotating shaft 17 in either direction at will. The lever 23 being formed of a spring steel rod normally holds the wheel 20 clear from the disk 27. To operate; the lever 23 is grasped and forced to one side of the center of the disk 27 and then brought to bear against the rotating disk 27. This rotates the smaller wheel 20 and the shaft 17. The reverse motion is obtained by pulling the lever to the opposite side of the center of the disk 27 and again thrusting the wheel 20 into contact with the rotating disk. Thus it is seen that the two directions of rotation are imparted to the shaft 17 at will. Upon releasing the lever the spring tension of the rod brings it back to the normal position with no parts contacting.

The worm 13 meshes with a worm wheel 30 which is fixedly mounted on the shaft 11. Also mounted on shaft 11 are spur gears 31 and 32 which mesh with racks 33 and 34 carried on the under side of the boom arms 35 and 36 respectively and which gears form the support for said boom arms.

To hold the gears in mesh with the racks and allow the backward and forward movement necessary for the boom arms, plates 37 and 38 respectively are provided which have a shoe for sliding on the backs of the beam and are pivotally mounted around the shaft 11 as shown at 39.

The above described construction provides the means for extending or withdrawing the boom by manipulating the lever 23 with the consequent rotation of shaft 17 and its joined mechanism.

The means for rotating the cutter wheel D consists of a hollow shaft 40 rotatably mounted on shaft 11. One end of shaft 40 is equipped with an idler pulley 41 and a fixed pulley 42. A shifting belt 43 connects one of these pulleys to a pulley 44 provided on the shaft 26 of the engine B. The hollow shaft 40 also has a helical gear 45 fixedly mounted thereon which meshes with a smaller helical gear 46 keyed to shaft 47. Shaft 47 telescopes into a larger hollow shaft 48 and is connected thereto by a spline 49. Shaft 47 is also carried by bearings 50 mounted on the plate 37 while the shaft 48 is carried by bearings 51 mounted on the arm 35 of the boom.

This mechanism furnishes the means whereby the driving mechanism for the cutter wheel may be extended or contracted.

At the outer end of the arms 35 and 36 a cutter wheel generally designated D is suitably mounted on shaft 70, journaled in bearings 53 and is driven by a set of mitre gears, one of which, numbered 54 is driven by shaft 48 and the other 55 meshing with 54 is fixedly mounted on the shaft that carries the cutting wheel D.

As a means of stopping the cutting wheel from digging in and burying itself in soil when used as a ditch cleaning machine, a rotatable trailer wheel generally designated 60 is swivelly mounted on the boom arm as shown at 61 on the rearward side of the cutter wheel D.

In ditch digging this wheel would be removed and comes into play only when the cutter wheel is cutting debris and the supporting tension on the cable 63 has been released. The cable 63 is attached to the forward end of the boom as shown at 64 and runs over a sheave 65 supported in a head frame 66 which frame is mounted on the platform 2, while the cable continues on to the hoist drum 8 to which it is attached. This cable is used to lower or raise the boom into or out of a working position or to hold it up while traveling.

The cutter wheel as shown in Figs. 4 and 5 is made up of an octagonal central shaft 70 which is turned round on both ends as at 71 to take a bearing 53. Small angle irons or spokes 72 and 73 are bolted onto the flat octagonal faces as at 74. The iron 72 is bent somewhat forward of the iron 73. Annular rings 75 are bolted to the angle irons near the outer ends and serve as strengtheners and spacers. The angles are cross-braced as shown at 76. By placing one iron ahead of the other a diagonal mounting for the blade is provided.

Curved scoop-like cutting blades 77 are bolted to the ends of the irons 72 and 73 as shown at 78 and provided with sharp cutting edges 79. Upon rotation of the cutter in a plane at right angles to the ditch as shown in Fig. 1, the blades cut the earth from the solid end of the ditch, or the debris from the ditch, and throw it to one side of and upon the bank of the ditch.

The object of the above specific cutter construction is to provide means for replacing or changing blades conveniently.

The modified arrangement shown in Figs. 7 and 8 may be more advantageously used for cutting or cleaning ditches in the wake of the machine instead of along the side of the machine and comprises the cutting wheel D' mounted on the shaft 53'. Cross pieces 100 and 101 respectively are bolted across the ends of the arms of the boom and carry bearings 102 and 103 respectively which in turn rotatably carry the shaft 53'. A mitre gear 104 is mounted on the end of the shaft 48' and meshes with another gear 105 mounted on shaft 53'. A change to this modified form is quickly and easily made.

In considering my invention as above described it will be seen to comprise a portable power plant provided with an adjustable boom which may be projected outward from the machine to various distances, swung up and down, and revolved on the turntable to extend either from the side of the machine or in its wake, also that a revolving cutter wheel is provided on the end of the boom which may be reversed to run crosswise of the boom or parallel therewith so that in cutting ditches either at the side or in the wake of the machine the wheel can be made to rotate in a plane extending crosswise of the ditch, also that the blades are so shaped as to slice off the earth at the end of the ditch and by rotation of the wheel throw it on the bank along the side of the ditch.

Having set forth a description of one embodiment of my idea it is understood that I am entitled to perform such modifications and refinements as do not depart from the spirit nor the scope of the description and appended claims.

I claim:

1. In a machine for cleaning and digging ditches, the combination of a wheeled carriage, a platform supported on said carriage for revolution around a vertical axis, a boom mounted on the platform fulcrumed on a horizontal axis, rack and pinion means for shifting said boom back and forth on its fulcrum, a rotatable cutting wheel mounted on the outer end of said boom, a telescopic shaft extending along said boom arranged and adapted for rotating said cutting wheel from a source of power on said platform.

2. In a machine for cleaning and digging ditches, the combination of a wheeled carriage adapted to roll along the bank adjacent a ditch, a platform supported on said carriage for revolution around a vertical axis, a boom mounted on the platform fulcrumed on a horizontal axis, rack and pinion means for shifting said boom back and forth on its fulcrum to extend into the ditch, a rotatable cutting wheel mounted on the outer end of said boom, to operate in a plane running crosswise of the boom, power-transmitting means extending along said boom arranged and adapted for rotating said cutting wheel from a source of power on said platform.

3. In a machine for cleaning and digging ditches, a movable carriage, a rotatable shaft horizontally mounted thereon, a pair of pinions spacedly secured to said shaft, a boom provided with spaced racks extending along its sides fulcrumed on said pinions and shiftable thereon to position the boom in or out with respect to work, a rotatable cutting wheel mounted on the end of said boom, extensible means mounted on said boom arranged and adapted for rotating said cutting wheel, means for limiting the depth of cut of the cutting wheel comprising a trailer wheel pivotally mounted to the end of bottom adjacent the cutting wheel, said trailer wheel depending beneath the boom and adapted to roll on the earth to support the end of boom and cutting wheel at a predetermined cutting depth relative to the ground.

4. In a structure as specified in claim 3, said trailer wheel mounted on an axis extending substantially at right angles to the axis of the cutter wheel.

5. In a ditch excavating machine, a laterally projecting boom, a cutter wheel at the outer end thereof, power means extending along the boom for driving the cutter, and trailer means arranged to bear on the ground adjacent the cutter to support the boom and limit the depth of the cut.

HJALMAR EMANUEL JOHNSON.